April 27, 1965 F. P. RENNIE 3,181,012

SATURABLE REACTOR PULSE FORMING CIRCUIT HAVING AN EXTENDED LOW FREQUENCY OPERATING RANGE PROVIDED BY AUXILIARY REACTOR

Filed Feb. 5, 1963

INVENTOR.

Frank P. Rennie

BY [signature]

Attorney.

United States Patent Office 3,181,012
Patented Apr. 27, 1965

3,181,012

SATURABLE REACTOR PULSE FORMING CIRCUIT HAVING AN EXTENDED LOW FREQUENCY OPERATING RANGE PROVIDED BY AUXILIARY REACTOR

Frank P. Rennie, Stamford, Conn., assignor to General Time Corporation, New York, N.Y., a corporation of Delaware Filed Feb. 5, 1963, Ser. No. 256,470
9 Claims. (Cl. 307—88.5)

The present invention relates to a pulse forming circuit and more specifically to an improved pulse forming circuit having an extended low frequency operating range.

An object of this invention is to provide a new and improved magnetic pulse forming circuit capable of responding to alternating input signals, which vary in frequency over an extended frequency range, to produce output pulses having a predetermined constant energy content.

Another object of this invention is to provide a new and improved magnetic pulse forming circuit capable of responding to high frequency alternating input signals, which includes circuitry for reliably extending the lower end of the frequency range.

An additional object of this invention is to provide a pulse forming circuit of the type in which a saturable core is driven from one state of saturation to the other state of saturation in response to the receipt of an input signal and is automatically reset when the input signal terminates, characterized in that circuitry is provided for improving the positiveness of the resetting, particularly when the incoming signal has a gradual slope such as that which is characteristic of a low amplitude sine wave.

A general object of this invention is to provide a pulse forming circuit capable of reliable operation over a wide frequency range which may be constructed at low cost, making it particularly suitable for use in control and computing operations wherein such devices are required in large numbers.

Figure 1:
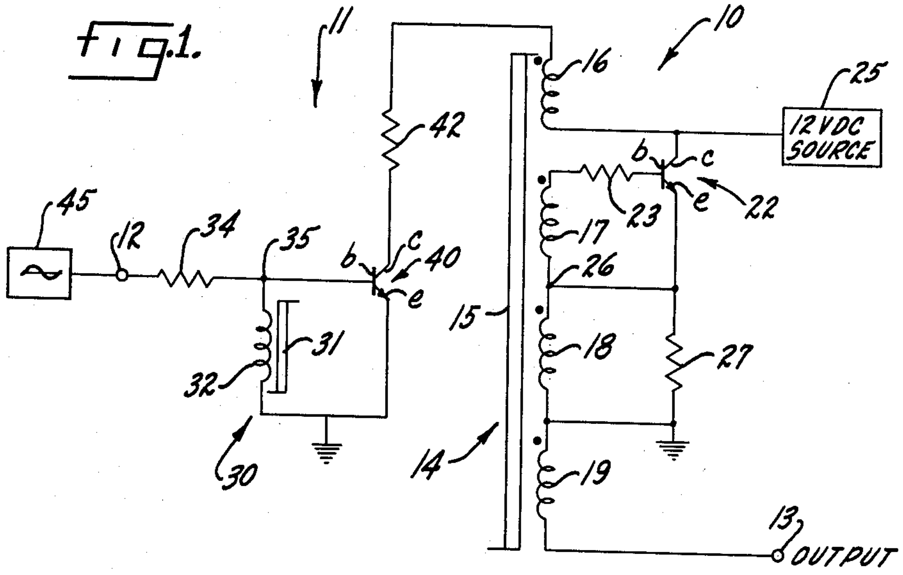
Figure 1A:
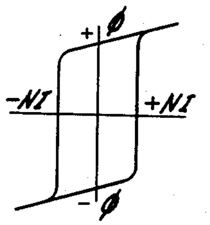
Figure 2:
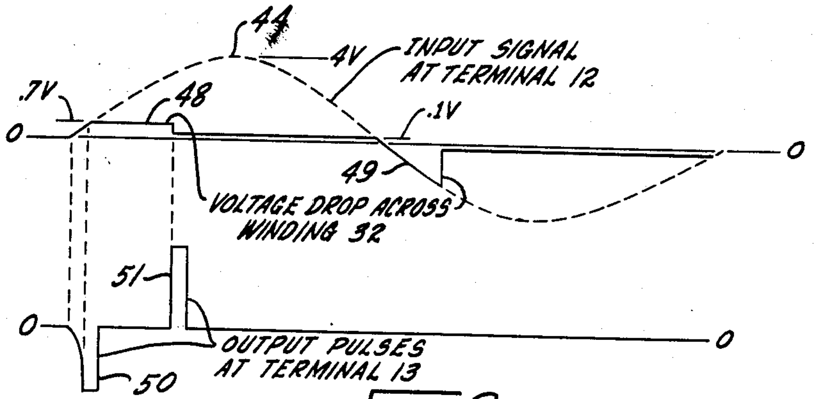

Other objects, and advantages, and aspects of the invention will become apparent by reference to the following detailed description of a specific embodiment thereof, when read in conjunction with the accompanying drawings, in which:

FIGURE 1 is a schematic diagram of a pulse forming circuit constructed in accordance with the preferred embodiment of the invention;

FIG. 1*a* is a plot of flux versus ampere-turns for the generally rectangular hysteresis loop core material employed in the saturable reactor of FIG. 1; and FIG. 2 shows a typical input signal and corresponding typical output pulses for the circuit illustrated in FIG. 1.

While the invention has been described in connection with a preferred embodiment, it will be understood that the invention is not limited to the disclosed embodiment, but on the contrary, I intend to cover the various modifications and equivalent arrangements included within the spirit and scope of the appended claims.

Referring now in detail to the drawings and more specifically to FIG. 1, a pulse forming circuit has been illustrated which includes a pulse forming stage 10 and an input signal control stage 11. Input signals are received at an input terminal 12 and output pulses are produced at an output terminal 13. Briefly stated, the function of the pulse forming circuit is to produce output pulses having a predetermined constant energy or volt-second content in response to the receipt of an input signal which may have a gradual slope and a low amplitude. The input signal may be an alternating signal which is continuously received or is received at desired intervals. More specifically, the function of the pulse forming circuit is to produce output pulses having a predetermined constant energy or volt-second content in response to the receipt of an alternating input signal which may vary in frequency over an extended frequency range. Devices of this type are widely utilized in electric circuitry, such as the circuitry utilized in control and computing operations.

Referring in more detail to the pulse forming stage 10, the stage includes a saturable reactor 14 having a magnetic core 15 and a plurality of windings wound thereon. These windings include a saturating winding 16, a triggering winding 17, a reset winding 18, and an output winding 19. The saturating winding 16 is illustrated as being detached from the other three windings, although it is to be understood that a continuous, tapped winding may be utilized without departing from the invention. For the details of the saturable reactor 14, reference is made to U.S. Patent 2,897,380, issued July 28, 1959, on the application of Carl Neitzert. Briefly stated, the magnetic core is made by spirally winding a tape made of a material which is especially formulated and heat treated to produce a sharply defined and substantially rectangular hysteresis loop. One such material is commercially available under the trade name "Mo-Permalloy." The windings on the saturable reactor 15 consist of turns of a fine gauge insulated wire.

The operation of the pulse forming stage 10, briefly stated, is as follows. A current pulse, which has a predetermined polarity, is applied to the saturating winding 16. The current pulse has sufficient magnitude to induce a magnetizing force adjacent the magnetic core 15 which is more than sufficient to drive the magnetic core from a state of negative saturation to a state of positive saturation (the magnetizing force having a magnitude greater than the differential coercive force between the two states of saturation). When the current pulse is abruptly removed from the saturating winding 16, the magnetic intensity of the magnetic core 15 rapidly is reduced to a zero value causing a collapse of the excess flux which in turn causes a positive control voltage to be induced in the triggering winding 17 that triggers a switch 22 and causes current to flow in the reset winding 18. The current flowing in the reset winding 18 has sufficient magnitude to induce a magnetizing force adjacent the magnetic core 15 which drives the magnetic core back to the state of negative saturation. An output pulse is induced in the output winding 19 when the magnetic core 15 is driven from one state of saturation to the other state of saturation and the induced output pulses are applied to the output terminal 13, since it is connected to the output winding.

The switch 22 has an input control circuit connected to the triggering winding 17 through a current limiting resistor 23 so that the positive control voltage induced in the triggering winding 17 is applied to the input control circuit and has an output circuit connected to the reset winding 18 so that current may flow therefrom through the reset winding 18. The switch 22 is illustrated in the form of a transistor having a base, an emitter and a collector (indicated as *b*, *e* and *c*, respectively). Preferably, an NPN type transistor having a common collector circuit is used, though it will be apparent to one skilled in the art that a PNP type transistor may be used with only minor modifications of the circuit being required. The base or control terminal of the transistor 22 is connected to the dotted terminal of the triggering winding 17, the collector is connected to a voltage source 25 and the emitter is connected to a common connection 26 between the triggering winding 17 and the reset winding 18. In response to the inducement of a positive control voltage in the triggering winding 17, the transistor 22 is rendered conductive so that current flows from the voltage source 25 through the collector-emitter circuit of the transistor and through the reset winding 18.

A damping resistor 27 is connected directly across the reset winding 18. The damping resistor is provided to insure against the inducement of a positive control voltage in the triggering winding 17 by a reduction of current flow through the saturating winding 16 until the magnetic core 15 has been fully saturated in the positive direction.

In accordance with the present invention, the input signal control stage 11 includes a saturable reactor which is saturated in response to the application thereto of an input signal having a gradual slope and a low amplitude, characteristic of a low frequency input wave, to increase the abruptness of the termination of the signal applied to the pulse forming stage 10 so that the pulse forming circuit operates reliably even at low frequencies. More specifically, an auxiliary saturable reactor is connected in parallel with the pulse forming stage input circuit for loading the signal source, with the voltage developed across the auxiliary saturable reactor being used to control an amplifier-switching element, such as a transistor, which in turn provides the current flow through the saturating winding of the saturable reactor in the pulse forming stage.

Thus, in the present embodiment, an auxiliary saturable reactor 30 is provided which has a magnetic core 31 and a winding 32. The winding 32 is connected to the input terminal 12 through a series resistor 34 so that the saturable reactor 30 tends to load the input terminal 12. A control signal having an amplitude which depends upon the amplitude of the input signal and the degree of saturation of the saturable reactor 30 is thus provided at a common terminal 35 between the input winding 32 and the series resistor 34, terminal 35 acting as a secondary input terminal.

For responding to the control signal at terminal 35, an auxiliary switch 40 is provided which has its input circuit connected across the winding 32 of the saturable reactor 30 and which has its output circuit connected in series with the saturating winding 16 of the saturable reactor 14 in the pulse forming stage 10. The switch 40 is illustrated in the form of a transistor having a base, an emitter, and a collector (indicated as *b*, *e* and *c*, respectively). Preferably, an NPN type transistor is used, though it will be obvious to one having ordinary skill in the art that a PNP type transistor may be utilized with only minor modifications of the circuit. Thus it will be noted that the base-emitter circuit of the transistor 40 is connected across the winding 32 and the collector circuit thereof is connected in series with the input winding 16. For the purpose of limiting the amount of collector current, a resistor 42 is connected in series with the collector.

In a practical application, the saturable reactor 30 may have a core 31 constructed by spirally winding fifty wraps of one-quarter milli-inch tape of "4–79 Mo-Permalloy" on a bobbin one-quarter inch wide with a one-quarter inch diameter and the turns may simply be one continuous winding in one direction of No. 34 enamelled wire wound to provide one hundred turns with taps being brought out to make the necessary circuit connections. A saturable reactor formed of the above material has a substantially rectangular hysteresis loop as shown in FIG. 1*a*.

In a typical pulse forming operation wherein an input signal 44 similar to that illustrated in FIG. 2 is provided by a sine wave source 45, current flows through the series resistor 34 and through the winding 32 of the saturable reactor 30. During the positive portion of each input signal cycle, the current flowing through the winding 32 induces a magnetizing force adjacent the magnetic core 31 that drives the magnetic core 31 from a state of negative saturation to a state of positive saturation. A positive control voltage 48 is developed across the winding 32 during the time period when the magnetic core 31 is being driven between these two states of saturation. The positive control voltage 48 developed across the winding 32 initially follows the input signal curve and then levels off as determined by the impedance of the winding 32 (illustrated in FIG. 2). The positive control voltage is applied between the emitter and the base of the transistor 40 so that the transistor 40 is rendered conductive and current flows from the voltage source 25 through the saturating winding 16 which causes the magnetic core 15 to be driven from the state of negative saturation to the state of positive saturation. When the magnetic core 15 is driven from the negative state of saturation to the positive state of saturation, an output pulse (designated as pulse 50 in FIG. 2) is induced in the output winding 19 which is transmitted to the output terminal 13.

When the magnetic core 31 attains the positive state of saturation, the impedance of the winding 32 is reduced to essentially a zero value so that the positive control voltage 48 developed across the winding 32 is reduced to essentially a zero value, as illustrated in FIG. 2, and the base of the transistor 40 is essentially clamped to the emitter which is at ground potential and the transistor 40 is rendered nonconductive. When the transistor 40 is rapidly rendered nonconductive, the current flowing through the saturating winding 16 and the magnetic intensity of the magnetic core 15 are rapidly reduced to zero values causing a positive control signal to be induced in the triggering winding 17 which causes a reset current to be applied to the reset winding 18. In response to the flow of reset current through the reset winding 18, the magnetic core 15 is driven from the state of positive saturation to the state of negative saturation and, an output pulse (designated as pulse 51 in FIG. 2) is induced in the output winding 19 which is transmitted to the output terminal 13.

During the negative half of each input signal cycle, current flows through the winding 32 of the saturable reactor 30 which induces a magnetizing force adjacent the magnetic core 31 that drives the magnetic core 31 from the state of positive saturation to the state of negative saturation. The saturable reactor 30 saturates much earlier during the negative half cycle than during the positive half cycle since the negative input signal is not clamped by the base-emitter circuit of the transistor 40. A negative voltage signal 49 is developed across the winding 32 during each negative half cycle, as illustrated in FIG. 2, and this negative voltage maintains the transistor 40 nonconducting. The negative voltage signal 49 initially follows the input signal curve and, when the magnetic core attains the state of negative saturation, the impedance of the winding 32 and thus the voltage signal developed thereacross drop to essentially zero values. Thus, during the negative half of each input signal cycle, the saturable reactor 30 is conditioned for another cycle of operation.

Briefly stated, the function of the auxiliary saturable reactor 30 is to cause the transistor 40 to be rapidly rendered non-conductive so that the current flowing through the saturating winding 16 is abruptly terminated (is rapidly decayed to a zero value from a saturating value) and a positive control signal of sufficient magnitude to cause resetting of the saturable reactor 14 is induced in the triggering winding 17. As the frequency of the input signal is lowered and the slope thereof becomes more gradual, a point is reached (approximately 120 c.p.s. in the illustrated embodiment) where the magnetic core 31 is not positively saturated rapidly enough to cause the transistor 40 to be rapidly rendered nonconductive and the pulse forming circuit has attained a lower limit of operation. However, without the saturable reactor 30 being included in the input signal control stage 11, the lower limit of operation of the pulse forming circuit would occur when the input signal had a frequency in the range of 2000 c.p.s.

Thus it may be seen that the input signal control stage 11 of the present invention allows for the operation of a pulse forming circuit with lower frequency sine wave input signals, i.e., input signals having gradual slopes, on the order of 120 c.p.s. as well as with high frequency signals. Since the energy content of output pulses is determined by the positiveness of the resetting of the pulse forming stage saturable reactor, the disclosed input signal control stage, which includes an auxiliary saturable reactor, causes output pulses to be produced which have a predetermined constant energy content even when the input signal has a gradual slope.

The input resistor 34 has been used to secure the required voltage drop, though it is to be understood the source 45 could be a high impedance source and the input resistor 34 could be deleted.

While the windings of the pulse forming stage 10 are illustrated and referred to separately, it is to be understood that the invention is not limited thereto and the functions of the windings may, if desired, be combined.

I claim as my invention:

1. A pulse forming circuit having an extended low frequency range, which comprises: a core of readily saturable magnetic material having a generally rectangular hysteresis loop, a saturating winding, a triggering winding and a reset winding all wound on the core, a source of current, a switching device connected to the source of current and having an input circuit and an output circuit respectively connected to the triggering and reset windings so that upon abrupt termination of current flow in the saturating winding a voltage is induced in the triggering winding causing current to flow in the switching device output circuit that drives the core to the opposite condition of saturation, and means including an auxiliary saturable reactor connected to the saturating winding for controlling the flow of current from the source through the saturating winding and for increasing the abruptness of the rate of change of current in the saturating winding.

2. A pulse forming circuit having an extended low frequency range, which comprises: a core of readily saturable magnetic material having a generally rectangular hysteresis loop, a saturating winding, a triggering winding and a reset winding all wound on the core, a source of current, a switching device connected to the source of current and having an input circuit and an output circuit respectively connected to the triggering and reset windings so that upon abrupt termination of current flow in the saturating winding a voltage is induced in the triggering winding causing current to flow in the switching device output circuit that drives the core to the opposite condition of saturation, means including an auxiliary saturable reactor connected to the saturating winding for controlling the flow of current from the source through the saturating winding and for increasing the abruptness of the rate of change of current in the saturating winding, and an input resistive loading device connected in series with the means including a saturable reactor.

3. A pulse forming circuit having an extended low frequency range, which comprises: a core of readily saturable magnetic material having a generally rectangular hysteresis loop, a saturating winding, a triggering winding and a reset winding all wound on the core, a source of current, a switching device connected to the source of current and having an input circuit and an output circuit respectively connected to the triggering and reset windings so that upon abrupt termination of current flow in the saturating winding a voltage is induced in the triggering winding causing current to flow in the switching device output circuit that drives the core to the opposite condition of saturation, and an auxiliary switching device having an input circuit which includes an auxiliary saturable reactor and having an output circuit connected to the saturating winding for controlling the flow of current from the source through the saturating winding and for increasing the abruptness of the rate of change of current in the saturating winding.

4. A pulse forming circuit having an extended low frequency range, which comprises: a core of readily saturable magnetic material having a generally rectangular hysteresis loop, a saturating winding, a triggering winding and a reset winding all wound on the core, a source of current, a switching device connected to the source of current and having an input circuit and an output circuit respectively connected to the triggering and reset windings so that upon abrupt termination of current flow in the saturating winding a voltage is induced in the triggering winding causing current to flow in the switching device output circuit that drives the core to the opposite condition of saturation, an auxiliary transistor having an input circuit and an output circuit, the transistor output circuit being connected in series with the saturating winding and controlling the flow of current from the source through the saturating winding, an auxiliary saturable reactor having a control winding which is connected in parallel with the transistor input circuit, the auxiliary saturable reactor and the auxiliary transistor operating to increase the abruptness of the rate of change of current in the saturating winding, and an input resistor connected in series with the transistor input circuit.

5. A pulse forming circuit responsive to alternating input signals having gradual slopes, which comprises: a saturable reactor device having a substantially rectangular hysteresis loop; an output conductor electromagnetically associated with the saturable reactor device wherein output pulses are induced when the saturable reactor device is driven from one state of saturation to the other state of saturation; means electromagnetically associated with the saturable reactor device and responsive to the abrupt termination of the inducement of a magnetizing force adjacent the saturable reactor device when the saturable reactor device has attained the secondary state of saturation for inducing a magnetizing force adjacent the saturable reactor device that drives the saturable reactor device from the secondary state of saturation to the primary state of saturation; and control means, including an auxiliary saturable reactor having a substantially rectangular hysteresis loop, electromagnetically associated with the saturable reactor device and responsive to an input signal for inducing a magnetizing force adjacent the saturable reactor device which drives the saturable reactor device from the primary state of saturation to the secondary state of saturation and for abruptly terminating the inducement of the magnetizing force after the saturable reactor device has attained the secondary state of saturation.

6. A pulse forming circuit responsive to alternating input signals having gradual slopes, which comprises: a saturable reactor core having a substantially rectangular hysteresis loop and having a saturating winding, a triggering winding, a reset winding, and an output winding wound thereon, an output pulse being induced in the output winding when the saturable reactor core is drive from one state of saturation to the other state of saturation; a source of current; a switch device connected to the source of current and having an input circuit and an output circuit respectively connected to the triggering winding and the reset winding, the switch device being rendered operative in response to the inducement of a control voltage in the triggering winding to cause current to flow from the source of current through the reset winding which causes the saturable reactor core to be driven from a secondary state of saturation to a primary state of saturation, a control voltage being induced in the triggering winding when the saturable reactor core has attained the secondary state of saturation and the current flow through the saturated winding is abruptly terminated; and control means, including an auxiliary saturable reactor having a substantially rectangular hysteresis loop, connected to the saturating winding and responsive to an input signal for causing current to flow through the saturating winding which causes the saturable reactor core to be driven from the primary state of saturation to the secondary state of saturation and for abruptly terminating the current flow through the saturating winding after the saturable reactor core has attained the secondary state of saturation.

7. A pulse forming circuit responsive to alternating input signals having gradual slopes, which comprises: a saturable reactor core having a substantially rectangular hysteresis loop and having a saturating winding, a triggering winding, a reset winding, and an output winding wound thereon, an output pulse being induced in the output winding when the saturable reactor core is driven from one state of saturation to the other state of saturation; a source of current; a switch device connected to the source of current and having an input circuit and an output circuit respectively connected to the triggering winding and the reset winding, the switch device being rendered operative in response to the inducement of a control voltage in the triggering winding to cause current to flow from the source of current through the reset winding which causes the saturable reactor core to be driven from a secondary state of saturation to a primary state of saturation, a control voltage being induced in the triggering winding when the saturable reactor core has attained the secondary state of saturation and current flow through the saturating winding is abruptly terminated; control means, including an auxiliary saturable reactor having a substantially rectangular hysteresis loop, connected to the saturating winding and responsive to an input signal for causing current to flow through the saturating winding which causes the saturable reactor core to be driven from the primary state of saturation to the secondary state of saturation and for abruptly terminating the current flow through the saturating winding after the saturable reactor has attained a secondary state of saturation; and a resistive loading device connected in series with the control means for limiting the current flow of the input signal.

8. A pulse forming circuit responsive to alternating input signals having gradual slopes and low amplitudes, which comprises: a saturable reactor core having a substantially rectangular hysteresis loop and having a saturating winding, a triggering winding, a reset winding, and an output winding wound thereon, an output pulse being induced in the output winding when the saturable reactor core is driven from one state of saturation to the other state of saturation; a source of current; a switch device connected to the source of current and having an input circuit and an output circuit respectively connected to the triggering winding and the reset winding, the switch device being rendered operative in response to the inducement of a control voltage in the triggering winding to cause current to flow from the source of current through the reset winding which causes the saturable reactor core to be driven from a secondary state of saturation to a primary state of saturation, a control voltage being induced in the triggering winding when the saturable reactor core has attained the secondary state of saturation and current flow through the saturating winding is abruptly terminated; an auxiliary switch device having an input circuit and an output circuit, the saturating winding being connected to the output circuit of the auxiliary switch device and being connected to the source of current so that current flows through the saturating winding when the auxiliary switch device is rendered operative which causes the saturable reactor core to be driven from the primary state of saturation to the secondary state of saturation; an input conductor, wherein alternating input signals are transmitted, connected to the auxiliary switch input circuit; and an auxiliary saturable reactor having a substantially rectangular hysteresis loop and having a winding wound thereon which is connected in the auxiliary switch input circuit, current flowing through the saturable reactor winding which drives the saturable reactor from a primary state of saturation to a secondary state of saturation when the input signal is of a first polarity and which drives the saturable reactor from the secondary state of saturation to the primary state of saturation when the input signal is of a second polarity, the auxiliary switch device being rendered operative when the saturable reactor is being driven from the primary state of saturation to the secondary state of saturation and being abruptly rendered non-operative when the saturable reactor attains the secondary state of saturation so that current flow through the saturating winding is abruptly terminated.

9. A pulse forming circuit responsive to alternating input signals having gradual slopes, which comprises: a saturable reactor core having a substantially rectangular hysteresis loop and having a saturating winding, a triggering winding, a reset winding, and an output winding wound thereon, an output pulse being induced in the output winding when the saturable reactor core is driven from one state of saturation to the other state of saturation; a source of current; a switch device connected to the source of current and having an input circuit and an output circuit respectively connected to the triggering winding and the reset winding, the switch device being rendered operative in response to the inducement of a control voltage in the triggering winding to cause current to flow from the source of current through the reset winding which causes the saturable reactor core to be driven from a secondary state of saturation to a primary state of saturation, a control voltage being induced in the triggering winding when the saturable reactor core has attained the secondary state of saturation and current flow through the saturating winding is abruptly terminated; an auxiliary transistor having an input circuit and an output circuit, the saturating winding being connected to the output circuit of the transistor and being connected to the source of current so that current flows through the saturating winding when the transistor is rendered operative which cause the saturable reactor core to be driven from the primary state of saturation to the secondary state of saturation; an input conductor, wherein alternating input signals are transmitted, connected to the auxiliary transistor input circuit; an auxiliary saturable reactor having a substantially rectangular hysteresis loop and having a winding wound thereon which is connected in parallel with the transistor input circuit, current flowing through the saturable reactor which drives the saturable reactor from a primary state of saturation to a secondary state of saturation when the input signal is of a first polarity and which drives the saturable reactor from the secondary state of saturation to the primary state of saturation when the input signal is of a second polarity, the transistor being rendered operative when the saturable reactor is being driven from the primary state of saturation to the secondary state of saturation and being abruptly rendered nonoperative when the saturable reactor attains the secondary state of saturation so that current flow through the saturating winding is abruptly terminated; and a resistor connected in series with the transistor input circuit for limiting the current flow therein.

References Cited by the Examiner

UNITED STATES PATENTS

| | | | |
|---|---|---|---|
| 2,897,380 | 7/59 | Neitzert | 307—88.5 X |
| 3,032,663 | 5/62 | Tillman | 307—88.5 X |

OTHER REFERENCES

Pub. I, "Transistor Pulse Circuit," by Kuntzleman et al., IBM Technical Disclosure Bulletin, vol. 2, No. 4, dated December 1959, page 89.

ARTHUR GAUSS, *Primary Examiner.*